US005653192A

United States Patent [19]
Sheen et al.

[11] Patent Number: 5,653,192
[45] Date of Patent: Aug. 5, 1997

[54] LIVESTOCK IDENTIFICATION APPARATUS

[75] Inventors: Joseph S. Sheen, Olathe, Kans.; Lars H. Andersson, Sodertalje, Sweden; Philip M. Wirth, Pleasant Hill; William Edward Spencer, Parkville, both of Mo.

[73] Assignee: Alfa Laval Agri Inc., Kansas City, Mo.

[21] Appl. No.: 611,756

[22] Filed: Mar. 6, 1996

[51] Int. Cl.[6] .................................................... A01K 29/00
[52] U.S. Cl. ................................................................ 119/51.02
[58] Field of Search .............................. 119/51.02, 840, 119/843, 14.03

[56] References Cited

U.S. PATENT DOCUMENTS

| | | |
|---|---|---|
| 3,631,442 | 12/1971 | Fearon . |
| 4,016,553 | 4/1977 | Novikoff et al. . |
| 4,243,980 | 1/1981 | Lichtblau . |
| 4,251,808 | 2/1981 | Lichtblau . |
| 4,384,281 | 5/1983 | Cooper . |
| 4,489,313 | 12/1984 | Pfister . |
| 4,527,152 | 7/1985 | Scarr et al. . |
| 4,539,558 | 9/1985 | Fearon . |
| 4,795,995 | 1/1989 | Eccleston et al. . |
| 4,798,175 | 1/1989 | Townsend et al. . |
| 4,872,018 | 10/1989 | Feltz et al. . |
| 4,972,198 | 11/1990 | Feltz et al. . |
| 5,005,001 | 4/1991 | Cordery . |
| 5,008,660 | 4/1991 | de Jong ........................... 119/51.02 X |
| 5,103,234 | 4/1992 | Watkins et al. . |
| 5,103,235 | 4/1992 | Clemens . |
| 5,130,697 | 7/1992 | McGinn . |
| 5,183,008 | 2/1993 | Carrano . |
| 5,320,067 | 6/1994 | Legrain ............................... 119/51.02 |
| 5,367,291 | 11/1994 | Fockens . |
| 5,397,986 | 3/1995 | Conway et al. . |

*Primary Examiner*—Thomas Price
*Attorney, Agent, or Firm*—Hovey, Williams, Timmons & Collins

[57] ABSTRACT

A livestock identification apparatus 10 for automatically identifying and sorting livestock as they walk through the apparatus 10 is disclosed. The apparatus 10 includes an alley 12, a gate 14 for controlling passage through the alley 12, and an identification sensor 18 disposed within or adjacent the alley 12 for identifying animals passing through the alley 12. The identification sensor 18 includes a pair of rigid antennas 48,50 positioned on opposite sides of the alley 12 for energizing and reading transponders on animals passing through the alley 12. In another embodiment of the invention, the identification sensor 208 includes a gate 204 controlling entry into a milking parlor or other confined area, a first stationary antenna 210 positioned on one side of the entrance to the milking parlor and a second moveable antenna 212 integrally formed with the gate 204.

18 Claims, 2 Drawing Sheets

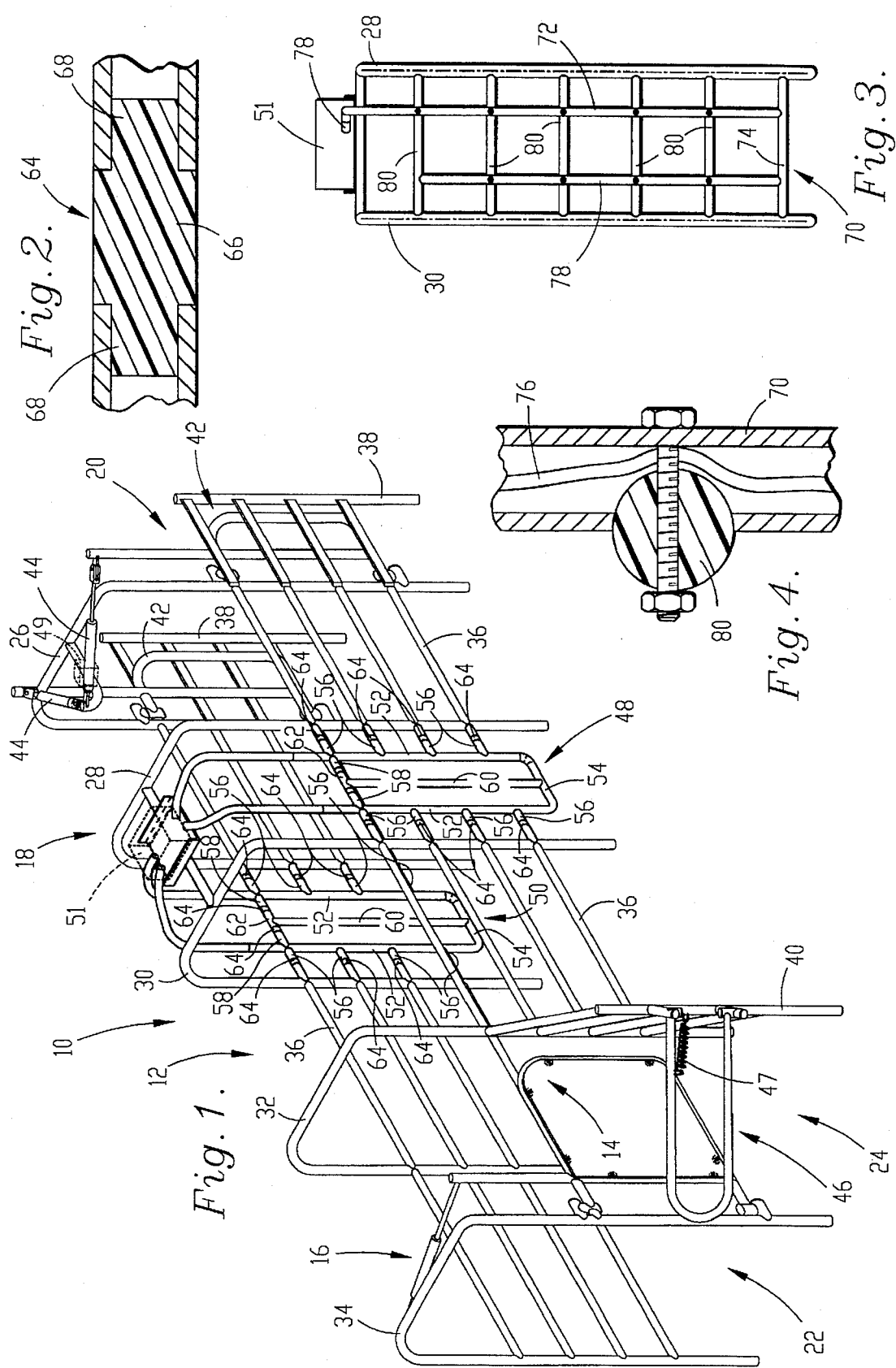

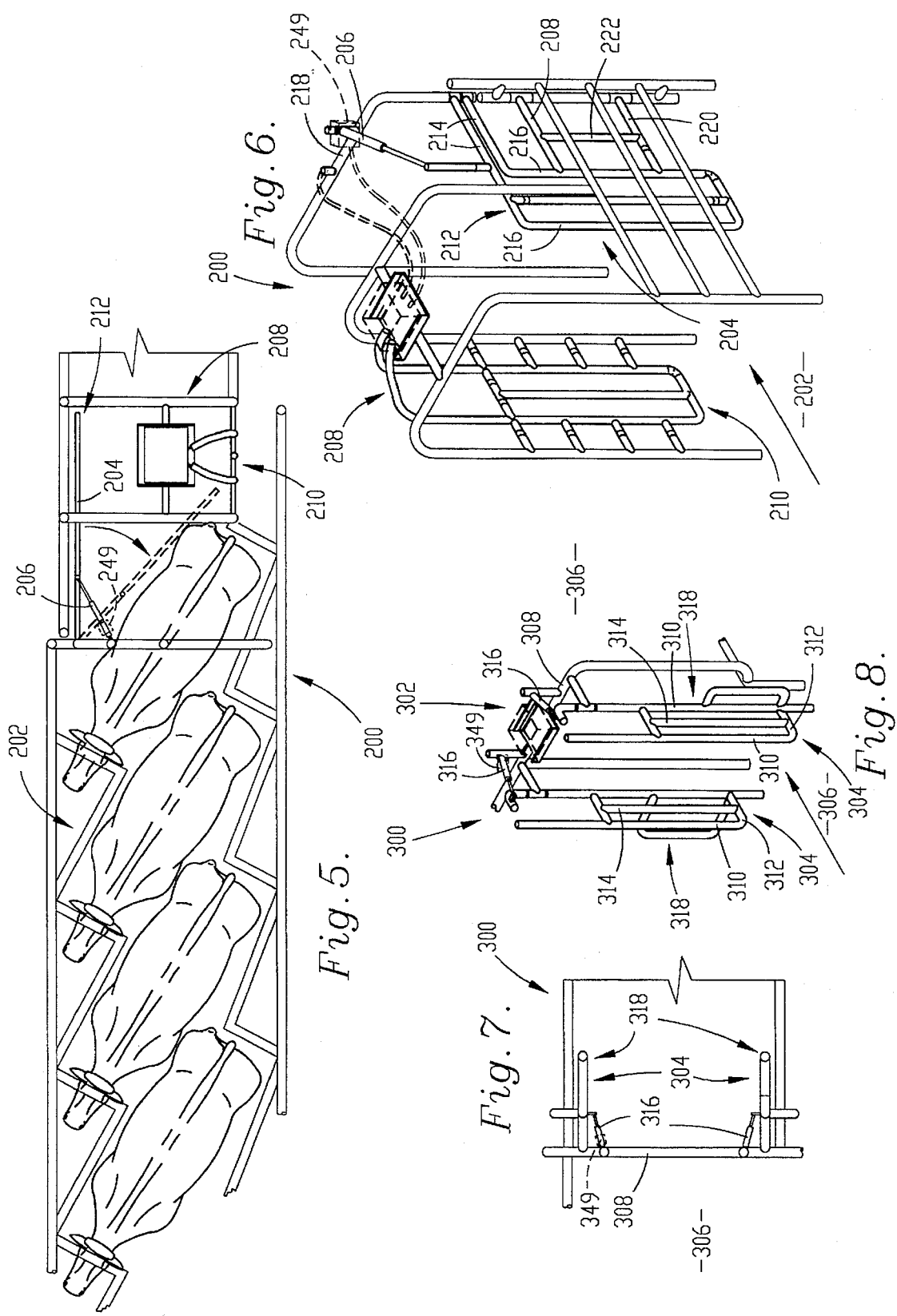

LIVESTOCK IDENTIFICATION APPARATUS

BACKGROUND OF THE INVENTION

1. Field of the Invention

The present invention relates generally to livestock handling equipment, and more particularly to a livestock identification apparatus for automatically identifying and sorting livestock as they walk through the apparatus.

2. Discussion of the Prior Art

Livestock identification apparatuses for automatically identifying and sorting livestock are known in the art. For example, U.S. Pat. No. 4,798,175 discloses an electronic identification system for sensing the presence of livestock passing through an alley and for providing an electrical signal when an animal to be sorted is present. The identification system includes a double loop antenna supported on a flexible curtain that generates a multidirectional electromagnetic field in the vicinity of the alley at a position intermediate the ends of the alley.

Each animal to be identified wears a transponder that becomes energized when exposed to the electromagnetic field. When energized, each transponder transmits identifying data back to the antenna loop. A decoding circuit coupled with the antenna decodes the identification data and identifies the animal wearing the transponder.

Identification apparatuses such as the one described above are typically coupled with a sorting gate such as a cutter gate for sorting animals after they have been identified for special handling such as periodic medical treatment or the like. Conventional sorting gates include an elongated alley having a first end presenting an entrance and a second end presenting a main exit and a sort exit. An automatic gate is positioned in the second end of the alley for movement between a sorting position in which the gate blocks the main exit and opens the sort exit, and a non-sorting position in which the gate opens the main exit and closes the sort exit. When an animal to be sorted is detected by the identification apparatus, an electrical signal is produced that triggers a controller or valve to move the gate to the sorting position.

The identification apparatuses may also be coupled with dairy parlor entry gates for controlling entry into milking stalls and pens. Conventional dairy parlor gates are similar to the sorting gates described above except that they are typically placed near the entrance to milking stalls rather that adjacent a sorting area.

Prior art animal identification apparatuses suffer from several limitations that limit their utility. For example, since prior art animal identification systems typically have antennas that are mounted in flexible curtains, animals often push the antennas aside and escape from being identified.

Another problem with prior art animal identification systems is the difficulty in reading the transponder of the first animal in a string. The sorting gate or the parlor entry gate on conventional animal identification systems is usually positioned downstream of the antenna. This is a problem because the first animal in a sting may be past the antenna when the gate opens, therefore its transponder is not activated by the antennas.

Moving the sorting gate upstream of the antenna is not practical because the animals must be identified before they are sorted. Similarly, moving the entry gate upstream of the antennas is not desirable because it is preferred to position dairy parlor entry gates on the milking stall side of the antennas so that the gate can hold the last cow of the preceding string in position. For example, when the gate is in the closed position, the last cow is held between a stanchion and the entry gate to prevent her from moving out of position and the reach of the herdsman.

Rigid antennas for use in animal identification systems are known in the art. However, these prior art rigid antennas have been used only in support posts and the like and do not allow sorting of animals. These prior art rigid antennas also suffer from the above-described "first cow" problem.

OBJECTS AND SUMMARY OF THE INVENTION

In view of the limitations of prior art animal identification systems discussed above, it is an object of the present invention to provide an improved animal identification and sorting apparatus that more effectively identifies and sorts animals passing through an alley.

It is a more particular object of the present invention to provide an animal identification and sorting apparatus with a pair of rigid antennas that effectively identifies and sorts animals while preventing the animals from pushing aside the antennas and escaping.

It is another object of the present invention to provide a rigid antenna that is totally contained within a metallic magnetic steel pipe without exposing sorted animals to any electric currents.

It is another object of the present invention to provide an animal identification and sorting apparatus that effectively identifies and sorts all the animals in a string including the first animal in the string.

In view of these objects and other objects that become evident from the description of the preferred embodiments of the invention herein, an improved animal identification and sorting apparatus is provided. One embodiment of the animal identification apparatus of the present invention broadly includes an elongated alley, a gate positioned in the alley, a shifting assembly for shifting the gate between sorting and non-sorting positions, and an identification sensor disposed within the alley for identifying livestock entering the alley.

In one embodiment of the invention, the identification sensor includes a pair of rigid antennas positioned on opposite sides of the alley for generating a multi-directional electromagnetic field in the vicinity of the alley. The antennas energize transponders worn by livestock passing through the alley and receive identification information from the transponders. The identification sensor may also include a controller responsive to the antennas for actuating the shifting assembly for shifting the gate between the sorting and non-sorting positions upon receiving identification information indicating that livestock is to be sorted.

In one construction, the antennas are formed of metallic tubular pipes that are electrically connected with the controller and act as the antennas. In a second construction, the antennas include an insulated antenna wire contained within metallic tubular pipes. This provides the structural rigidity of metal pipes without exposing the sorted animals to electric currents. In a third construction, the antennas include an insulated antenna wire contained within rigid, hollow, non-conductive tubular pipes.

Advantageously, the antennas are rigid and are placed on both sides of the alley. With this construction, the animals cannot push aside the antennas and escape. Moreover, since the antennas are placed on both sides of the alley, transponders worn by the animals are energized and read no matter where the transponders are located between the antennas.

In a second embodiment of the invention, the identification sensor includes a gate controlling entry into an alley, pen, milking stall or other confined area, a stationary antenna positioned on one side of the gate and a moveable antenna integrally formed with the gate. The moveable antenna is positioned so that it is opposite the stationary antenna when the gate is opened. With this construction, the stationary antenna and the moveable antenna are operable for both generating a multi-directional electromagnetic field in the vicinity of the gate and for forcing the first animal in the string backwards so that the animal passes through the electromagnetic field when the gate is shifted to the open position. This solves the "first cow" problem discussed above.

In a third embodiment of the invention, the identification sensor includes a pair of saloon type gates and a pair of moveable antennas integrally formed with the gates. The moveable antennas are positioned so that they face one another when the gates are opened. With this construction, the moveable antennas are operable for both generating a multi-directional electromagnetic field in the vicinity of the gates and for forcing the first animal in the string to pass through the electromagnetic field when the gate is shifted to the open position. This also solves the "first cow" problem discussed above.

All embodiments of the invention may also include a magnetically actuated switch on the cylinder of the gate or gates that turns off the radio frequency power of the controller. This assures that the identification sensor is only activated when the gate is open to prevent inadvertent readings and to conserve power.

BRIEF DESCRIPTION OF THE DRAWING FIGURES

A preferred embodiment of the present invention is described in detail below with reference to the attached drawing figures, wherein:

FIG. 1 is a perspective view of an animal identification apparatus constructed in accordance with a first preferred embodiment of the present invention;

FIG. 2 is a fragmentary sectional view of one of the antennas of the identification apparatus of FIG. 1;

FIG. 3 is a side view of an alternate antenna construction of the identification apparatus;

FIG. 4 is a fragmentary sectional view of the antenna illustrated in FIG. 3;

FIG. 5 is a top plan view of an animal identification apparatus constructed in accordance with a second embodiment of the invention;

FIG. 6 is a perspective view of the entry gate and identification sensor of the animal identification apparatus illustrated in FIG. 5;

FIG. 7 is a fragmentary top plan view of an animal identification apparatus constructed in accordance with a third embodiment of the invention; and FIG. 8 is a perspective view of the entry gate and identification sensor of the animal identification apparatus illustrated in FIG. 7.

DESCRIPTION OF THE PREFERRED EMBODIMENTS

EMBODIMENT OF FIGS. 1-4

An animal identification apparatus 10 constructed in accordance with a first preferred embodiment of the invention is illustrated in FIG. 1 and broadly includes an elongated alley 12, a sorting gate 14 positioned in the alley 12, a shifting assembly 16 for shifting the sorting gate 14 between an open sorting position and a closed non-sorting position, and an identification sensor system 18 disposed in the alley 12 for identifying livestock entering and passing through the alley 12.

In more detail, the alley 12 includes a first end presenting an entrance 20 and a second end presenting a main exit 22 and a sort exit 24. The alley 12 is preferably formed by five tubular arches 26, 28, 30, 32, and 34 each including a pair of posts 38 positioned on opposite sides of the alley 12 from one another and by a plurality of vertically-spaced, longitudinally extending rails 36 extending along each side of the alley 12 between the posts 38. An additional pair of posts 38 are provided on opposite sides of the entrance to define an extension beyond the first arch 26. Another post 40 is provided in the sort exit so that rails can be extended at least partially along the length of the sort exit downstream of the alley.

The sorting gate 14 is positioned in the alley 12 between the main exit 22 and the sort exit 24 and is shiftable between an open, sorting position in which it blocks the main exit 22 and opens the sort exit 24, and a closed non-sorting position, shown in FIG. 1 in which it blocks the sort exit 24 and opens the main exit 22.

The shifting assembly 16 is preferably a cylinder assembly operable for shifting the sorting gate 14 between the open and closed positions.

The animal identification apparatus 10 may also include a pair of entry gates 42 positioned at the entrance of the alley 12. The entry gates 42 are preferably saloon gates supported on opposite sides of the alley 12 at the entrance 20. The saloon gates 42 are shiftable toward and away from one another between a closed position in which they block the entrance 20 from incoming livestock and an open position in which they expose the entrance 20. Each saloon gate 42 is supported on one of the posts 38 of the entrance arch 26 for pivotal movement about a vertical axis.

Each entry gate 42 has a width equal to about one-half the width of the alley 12 so that when the gates 42 are closed they block the entrance 20 without interfering with one another. The advantage obtained by using saloon gates at the entrance 20 to the alley 12 resides in the ability of such gates to be shut quickly without trapping livestock or allowing them to slip past the gates 42 during closure.

A pair of cylinder assemblies 44 are coupled with the entry gates 42 for shifting the gates 42 between their opened and closed positions.

The animal identification apparatus 10 may also include an exit gate 46 positioned in the sort exit 24. The exit gate 46 is spaced from the sorting gate 14 along the sort exit 24, and is shiftable between a closed position in which the gate 46 is disposed in the path of the movement of the livestock through the sort exit 24 and an open position in which the gate 46 is removed from the path of movement.

The exit gate 46 is generally free to pivot about the vertical pivot axis and it does not include any drive means for shifting the gate 46 back and forth within the sort exit 24. Rather, the gate 46 is movable to the open position by livestock passing through the sort exit 24, and is returned to the closed position by a spring 47. The exit gate 46 bears against the arch 34 in the first position so that livestock are prevented from pushing the exit gate 46 back into the alley 12. The exit gate 46 is preferably provided with a limit switch for indicating passage of animals out of the sort exit 24.

The identification sensor system 18 is disposed within the alley 12 at a position intermediate the ends of the alley 12 for identifying livestock entering the alley 12 and for triggering the shifting assemblies 16,44. The identification sensor 18 broadly includes a pair of rigid antennas 48,50, a controller 51, and a transponder (not shown) worn by each animal to be identified by the apparatus 10. The operating principles of the identification sensor 18 are discussed in detail in U.S. Pat. No. 4,798,175, the disclosure of which is incorporated herein by this express reference.

The antennas 48,50 are positioned on opposite sides of the alley 12 and are operable for generating a multi-directional electromagnetic field in the vicinity of the alley 12. FIGS. 1 and 2 illustrate one preferred construction of the antennas 48,50. In this construction, each antenna 48,50 is formed of conductive, tubular pipes having a pair of horizontally spaced, vertically extending arms 52 and a horizontally extending bight section 54 interconnecting the lower ends of the arms 52. The arms 52 and bight section 54 together form an antenna loop that faces the alley 12.

The tops of the vertically extending arms 52 are bent horizontally inward and are electrically coupled with the controller 51. Each arm 52 also includes four short, horizontally extending stub sections 56 extending away from the antenna loop and a single stub section 58 extending into the antenna loop.

Each antenna 48,50 may also include a reinforcing arm 60 extending vertically upward from the bight section 54 between the arms 52. The reinforcing arm 60 includes an upper horizontally extending cross section 62 extending between the stub sections 58 for joining the reinforcing arm 60 to the arms 52.

Each of the antennas 48,50 illustrated in FIGS. 1 and 2 also includes a plurality of non-conductive couplers 64 for joining the reinforcing arm 60 to the stub sections 58 and for joining the arms 52 to the posts of the arches 28,30. The non-conductive couplers 64 are preferably formed from ultra high molecular weight synthetic resin materials, ceramics or other non-conductive materials and are provided for insulating the antennas 48,50 from the conductive posts of the arches 28,30 and for preventing the formation of electrically and magnetically conductive loops through the reinforcing arm 60 that would interfere with the operation of the antennas 48,50.

As best illustrated in FIG. 2, each non-conductive coupler 64 includes a central shoulder portion 66 and a pair of insert portions 68 extending from opposite sides of the shoulder portion 66. The shoulder portion 66 extends between and electrically isolates the antennas 48,50 from the remainder of the alley 12 and presents an outside diameter approximately equal to the outside diameter of the piping making up the alley 12 and the antennas 48,50.

The insert portions 68 are plug-shaped and extend from opposite sides of the shoulder portion 66. The insert portions 68 are inserted in the openings of the stub sections 56,58 and the reinforcing arms 60 for joining the antennas 48,50 to the alley 12 and the reinforcing arms 60 and present outside diameters approximately equal to the inside diameters of the pipes forming the stub sections 56,58.

The non-conductive couplers 64 may also be formed in the shape of a T or cruciform for joining three or four sections of conductive piping together. The couplers 64 are preferably molded but may also be machined.

FIGS. 3 and 4 illustrate several alternate constructions of the antennas. In these constructions, each antenna 70 is formed from rigid, hollow, tubular pipes having insulated antenna coils or wires wound therethrough. The tubular pipes may be formed from fiberglass or other non-conductive synthetic resin materials or may be formed from metallic steel. The non-conductive pipes better insulate the animals from electric currents, but the metallic steel pipes provide a more rigid construction.

In more detail, each antenna 70 of the alternate constructions includes a pair of horizontally spaced, vertically extending arms 72 and a horizontally extending bight section 74 interconnecting the lower ends of the arms 72. The arms 72 and bight section 74 together form an antenna loop that faces the alley 12.

Referring to FIG. 4, each antenna 70 of the alternate constructions includes a conductive, insulated antenna coil or wire 76 passing through its antenna loop formed by the arms 72 and bight section 74. The ends of the antenna coil or wire extend from an upper opening 78 (FIG. 3) in one of the arms 72 and are electrically connected with the controller 51. The antenna coil or wire is preferably a 12 gauge high inductance cable.

Returning to FIG. 3, each antenna 70 of this alternate construction may also include a series of vertically spaced, horizontally extending reinforcing arms 80 extending transversely between the posts of arches 28,30. As illustrated in FIG. 4, the reinforcing arms 80 are preferably bolted to the arms 72 for increasing the rigidity of the antenna 70.

In operation, all three of the above-described constructions of the antennas energize transponders worn by livestock passing through the alley and receive identification information from the transponders for use in identifying and sorting the animals. When the animal identification apparatus is used in dairy parlor applications, the antennas are spaced approximately 32 inches apart for permitting passage of large cows. Since the antennas are rigid and define a structural part of the alley, animals cannot push aside the antennas and escape. Moreover, since the antennas are placed on both sides of the alley, transponders worn by the animals are energized and read no matter which direction the animals heads are facing as they pass the antennas.

The preferred controller 51 is disclosed in more detail in U.S. Pat. No. 4,798,175 and includes a central processing unit, an energization control, and a decoder for receiving and decoding signals from the antennas and outputting them to a central processing unit. To accommodate for the 32" spacing of the antennas 48,50,70 the preferred controller operates at 16 VAC rather than 12 VAC, which is conventional for flexible antenna systems.

The controller 51 is responsive to the antennas 48,50,70 and receives and decodes identification information transmitted by transponders worn by animals passing through the apparatus 10. The controller 51 is also operable for actuating the shifting assemblies 16,44 for shifting the sorting gate 14 and entry gates 42 between the open and closed positions upon receiving identification information indicating that livestock is to be sorted.

With reference to FIG. 1, as livestock are directed through the apparatus 10, they enter the alley 12 at the entrance 20 and walk through the alley 12 to the main exit 22. The entry gates 42 are open and the sorting gate 14 is in the non-sorting position so that livestock can enter the alley 12 and are led from the main exit 22. As each animal passes the antenna 48,50,70, the transponder worn by the animal is sensed, and a signal indicative of the particular animal is supplied to the controller 51 where it is compared to a list of identification signals indicative of livestock to be sorted. Typically, this list is supplied to the processor by the central processing unit. If the animal is not to be sorted, nothing happens, and the animal is allowed to pass on through the alley 12 and out the main exit 22. However, when the signal supplied to the processor matches with a stored identification signal indicative of livestock to be sorted, the processor energizes the solenoid, causing air under pressure to be supplied to the cylinder 16 to move the sorting gate 14 to the sorting position, and to the cylinders 44 to close the saloon gates 42.

Movement of the gates 14,42 to these positions forces the animal in the alley 12 to exit the sort exit 24 instead of the main exit 22, and prevents other animals from entering the alley 12. After the animal to be sorted has passed through the sort exit 24, it pushes past the exit gate 46, causing closure of the limit switch. A signal is thereby provided to the processor which triggers energization of the solenoid so that air is supplied to the cylinder 16 to return the sorting gate 14 to the non-sorting position, and to the cylinders 44 to open the saloon gates 42. Thereafter, livestock are allowed to enter the alley 12 for further sorting.

As illustrated in FIG. 1, the animal identification apparatus 10 may also include a magnetically activated switch 49 mounted to either one of the cylinders 44 and electrically coupled with the controller 51 for turning off the controller when the gates 42 are closed. This assures that the identification sensor is only activated when the gates are open to prevent inadvertent readings and to conserve power.

EMBODIMENT OF FIGS. 5 AND 6

An animal identification apparatus 200 constructed in accordance with a second preferred embodiment of the invention is illustrated in FIGS. 5 and 6 and broadly includes a milking parlor 202, an entry gate 204 positioned in the entry of the parlor 202, a shifting assembly 206 for shifting the entry gate 204 between an open position and a closed position, and an identification sensor 208 adjacent the entrance for identifying livestock passing into the parlor. As illustrated in FIG. 5, the parlor 202 may include a plurality of conventional milking stalls 210 arranged in a herringbone or other configuration. Although shown in use with a milking parlor, the animal identification apparatus 200 could also be used identify and sort animals entering an alley, a sorting pen or other confined area.

The primary difference between the first and second embodiments of the invention is in the placement of the antennas. As best illustrated in FIG. 6, the identification sensor 208 of the second embodiment includes a stationary, rigid antenna 210 positioned on one side of the entrance to the parlor 202 and a moveable antenna 212 integrally formed with the entry gate 204 opposite the stationary antenna.

The stationary, rigid antenna 210 is substantially identical to the antennas 48,50,70 disclosed in the first embodiment of the invention and may be formed from either conductive pipes joined to the parlor 202 by non-conductive couplers or may be formed from hollow, conductive or non-conductive pipes having conductive antenna wires looped therethrough.

The entry gate 204 is positioned adjacent the entrance to the parlor 202 and is shiftable by the cylinder assembly 206 between a closed position in which it blocks the entrance as indicated by the dashed lines in FIG. 5 and an open position in which it permits animal entry into the entrance as indicated by the solid lines in FIG. 5.

Referring to FIG. 6, the entry gate 204 is preferably constructed of a pair of vertically spaced and horizontally extending arms 214 and a pair of horizontally spaced and vertically extending posts 216 that together form a loop for the moveable antenna 212 of the identification sensor 208 as described below. As illustrated, the loop faces the stationary antenna 210 when the entry gate 204 is opened. The ends of the arms 214 are pivotally mounted to a vertical post of an arch 218 defining the entrance to the parlor 202.

The entry gate 204 may also include a pair of horizontally extending reinforcing rods 220 each having one of its ends fixedly coupled to the arm 216 and the other of its ends pivotally coupled to the arch 218. A vertically extending reinforcing rod 222 extends between the rods 220 for adding structural rigidity.

The moveable antenna 212 is integrally formed with the loop of the entry gate 204 and is preferably constructed from hollow, non-conductive pipes having conductive antenna wires looped therethrough. This construction prevents the gate from becoming energized and thus prevents animals from being shocked when they touch the gates. However, the moveable antennas 212 may also be constructed from conductive pipes. As described in the first embodiment of the invention, if the moveable antenna 212 is formed from conductive pipes, it is joined to the reinforcing members 220 by non-conductive couplers.

Referring to FIG. 6, the stationary and moveable antennas 210,212 are positioned so that they face one another when the entry gate 204 is opened. Thus, the antennas 210,212 are operable for generating a multi-directional electromagnetic field in the vicinity of the entrance when the shifting assembly shifts the gate 204 to the open position. Additionally, since the moveable antenna 212 is integrally formed with the gate 204, the gate 204 and antenna 212 force the first animal in the string to back up and pass through the electromagnetic field generated by the antennas 212 when the gate 204 is shifted to the open position. This solves the "first cow" problem discussed above.

As illustrated in FIGS. 5 and 6, the animal identification apparatus 200 may also include a magnetically activated switch 249 mounted to the cylinder 206 and electrically coupled with the controller of the identification sensor 208 for turning off the controller when the gate 204 is closed. This assures that the identification sensor is only activated when the gate 204 is open to prevent inadvertent readings and to conserve power.

EMBODIMENT OF FIGS. 7 AND 8

An animal identification apparatus 300 constructed in accordance with a third preferred embodiment of the invention is illustrated in FIGS. 7 and 8. In this embodiment, the identification sensor 302 is coupled with a pair of entry gates 304 that provide access to a milking parlor 306, alley, sorting pen or other confined area.

The entry gates 304 are preferably saloon gates supported on opposite sides of an arch 308 having a pair of support posts defining an entrance. The saloon gates 308 are shiftable toward and away from one another between a closed position in which they block the entrance from incoming livestock and an open position in which they expose the entrance.

Each saloon gate 304 is supported on one of the posts of the entrance arch 308 for pivotal movement about a vertical axis, and includes a U-shaped tubular member presenting a pair of horizontally spaced, vertically extending arm sections 310, and an interconnecting, horizontally extending bight section 312 that together form a loop for the antennas 318 of the identification sensor 302 as described below. Each gate 304 may also include a reinforcing member 314 presenting a vertically extending section extending upwardly from the bight section 312 and a horizontally extending section extending between the arm sections 310.

Each gate 304 has a width equal to about one-half the width of the entrance so that when the gates 304 are closed they block the entrance without interfering with one another. The advantage obtained by using saloon gates 304 at the entrance resides in the ability of such gates 304 to be shut quickly without trapping livestock or allowing them to slip past the gate 304 during closure. A pair of cylinder assemblies 316 are coupled with the entry gates 304 for shifting the gates 304 between their opened and closed positions.

The identification sensor 302 of the third embodiment includes a pair of moveable antennas 318 integrally formed with the loops of the entry gates 304. The antennas 318 are preferably formed from hollow, non-conductive pipes having conductive antenna wires looped therethrough. As described above, this construction prevents the gates from becoming energized and thus prevents animals from being shocked when they touch the gates. However, the antennas may also be constructed from conductive pipes having antenna wires looped therethrough or from conductive pipes that are themselves energized. As described in the first embodiment of the invention, if the moveable antennas 318 are formed from conductive pipes, they are joined to the reinforcing members 314 by non-conductive couplers.

The moveable antennas 318 are positioned so that they are opposite one another when the entry gates 304 are opened. Thus, the antennas 318 are operable for generating a multi-directional electromagnetic field in the vicinity of the entrance when the shifting assembly shifts the gates 304 to the open position. Additionally, since the moveable antennas 318 are integrally formed with the gates 304, the gates 304 and antennas 318 force the first animal in the string to back up and pass through the electromagnetic field generated by the antennas 318 when the gates 304 are shifted to the open position. This solves the "first cow" problem discussed above.

As illustrated in FIGS. 7 and 8, the animal identification apparatus 300 may also include a magnetically activated switch 349 mounted to one of the cylinders 316 and electrically coupled with the controller of the identification sensor 302 for turning off the controller when the gates 304 are closed. This assures that the identification sensor is only activated when the gates 304 are open to prevent inadvertent readings and to conserve power.

Although the present invention has been described with reference to the preferred embodiment illustrated in the attached drawing figures, it is noted that substitutions may be made and equivalents employed herein without departing from the scope of the invention as recited in the claims. For example, it is possible to provide an identification sensor that generates a signal indicative of the presence of an animal to be sorted every time a collar or tag worn by an animal is detected. In accordance with this construction, collars or tags would only be placed on animals to be sorted and the need for a processing unit for comparing sensed signals to a previously stored list of signals representative of animals to be cut is eliminated.

Further, it is possible to employ a second identification sensor for identifying livestock exiting the sort exit and providing a signal indicative of the passage of an animal past the first gate through the sort exit in order to confirm proper sorting.

Having thus described the preferred embodiment of the invention, what is claimed as new and desired to be protected by Letters Patent includes the following:

1. A livestock identification apparatus for identifying and sorting animals wearing transponders, the identification apparatus comprising:
 a plurality of rails forming an alley presenting an entrance, a main exit and a sort exit;
 a gate positioned in the alley between the main exit and the sort exit, the gate being shiftable between a sorting position in which the gate blocks the main exit and opens the sort exit, and a non-sorting position in which the gate blocks the sort exit and opens the main exit;
 a shifting means for shifting the gate between the sorting and non-sorting positions; and
 a sensor means for identifying livestock entering the alley, the sensor means including
  a pair of rigid antennas secured to the rails of the alley for forming a part of the alley, the antennas being positioned on opposite sides of the alley for generating a multi-directional electromagnetic field in the vicinity of the alley for energizing the transponders and for receiving identification information from the transponders, and
  a control means responsive to the antennas for actuating the shifting means for shifting the gate between the sorting and non-sorting positions upon receiving identification information indicating that livestock is to be sorted.

2. The livestock identification apparatus as set forth in claim 1, the antennas including metallic tubular pipes electically connected to the controller.

3. The livestock identification apparatus as set forth in claim 2, further including non-conductive couplers for joining the antennas to the alley while electrically insulating the antennas from the alley.

4. The livestock identification apparatus as set forth in claim 1, the antennas each including hollow, non-conductive tubular pipes and a conductive coil disposed within the tubular members and coupled with the controller.

5. The livestock identification apparatus as set forth in claim 1, the control means including a microprocessor including decoding means for decoding the identification information and actuating means responsive to the decoding means for actuating the shifting means for shifting the gate between the sorting and non-sorting positions upon receiving identification information indicating that livestock is to be sorted.

6. The livestock identification apparatus as set forth in claim 1, wherein the distance between the antennas is approximately 25–35 inches.

7. A livestock identification apparatus for identifying and sorting animals wearing transponders, the identification apparatus comprising:
 an alley;
 a gate positioned adjacent the alley, the gate being shiftable between a closed position in which the gate blocks the alley and an open position in which the gate opens the alley;
 a shifting means for shifting the gate between the closed and open positions; and
 a sensor means for identifying livestock passing through the alley, the sensor means including
  a stationary, rigid antenna positioned on one side of the alley,
  a moveable antenna coupled with the gate,
  the stationary and moveable antennas being operable for generating a multi-directional electromagnetic field for energizing the transponders and for receiving identification information from the transponders when the shifting means shifts the gate to the open position, and a control means responsive to the antennas for identifying and counting livestock passing through the alley.

8. The livestock identification apparatus as set forth in claim 7, the moveable and stationary antennas including metallic tubular pipes eclectically connected to the controller.

9. The livestock identification apparatus as set forth in claim 8, further including non-conductive couplers for joining the moveable and stationary antennas to the alley while electrically insulating the antennas from the alley.

10. The livestock identification apparatus as set forth in claim 7, the moveable and stationary antennas each including hollow, non-conductive tubular pipes and a conductive coil disposed within the tubular members and coupled with the controller.

11. The livestock identification apparatus as set forth in claim 7, the control means including a microprocessor including decoding means for decoding the identification information.

12. The livestock identification apparatus as set forth in claim 7, wherein the distance between the first stationary antenna and the second moveable antenna is approximately 25-35 inches.

13. A livestock identification apparatus for identifying and sorting animals wearing transponders, the identification apparatus comprising:

an alley;

a pair of gates positioned on opposite sides of the alley, the gates being shiftable between a closed position in which the gates block the alley and an open position in which the gates open the alley;

a shifting means for shifting the gates between the open and closed positions; and a sensor means for identifying livestock entering the alley, the sensor means including a first moveable antenna coupled with one of the gates, a second moveable antenna coupled with the other of the gates, said first and second moveable antennas being operable for generating a multi-directional electromagnetic field for energizing the transponders and for receiving identification information from the transponders when the shifting means shifts the first and second moveable gates to the open position, and a control means responsive to the first and second moveable antennas for identifying and counting livestock passing through the alley.

14. The livestock identification apparatus as set forth in claim 13, the moveable and stationary antennas including metallic tubular pipes eclectically connected to the controller.

15. The livestock identification apparatus as set forth in claim 14, further including non-conductive couplers for joining the moveable and stationary antennas to the alley while electrically insulating the antennas from the alley.

16. The livestock identification apparatus as set forth in claim 13, the moveable and stationary antennas each including hollow, non-conductive tubular pipes and a conductive coil disposed within the tubular members and coupled with the controller.

17. The livestock identification apparatus as set forth in claim 13, the control means including a microprocessor including decoding means for decoding the identification information.

18. The livestock identification apparatus as set forth in claim 13, wherein the distance between the first and second moveable antennas when the first and second gates are open is 25-35 inches.

* * * * *